US011940961B2

(12) United States Patent
Fieglein et al.

(10) Patent No.: US 11,940,961 B2
(45) Date of Patent: Mar. 26, 2024

(54) IDENTITY-LESS PERSONALIZED COMMUNICATION SERVICE

(71) Applicant: Wayne Fueling Systems LLC, Austin, TX (US)

(72) Inventors: Henry Fieglein, Leander, TX (US); Hob Hairston, Cedar Park, TX (US); Rohith Chinnaswamy, RoundRock, TX (US)

(73) Assignee: Wayne Fueling Systems LLC, Austin, TX (US)

(*) Notice: Subject to any disclaimer, the term of this patent is extended or adjusted under 35 U.S.C. 154(b) by 168 days.

(21) Appl. No.: 17/452,706

(22) Filed: Oct. 28, 2021

(65) Prior Publication Data
US 2022/0138165 A1  May 5, 2022

Related U.S. Application Data

(60) Provisional application No. 63/107,105, filed on Oct. 29, 2020.

(51) Int. Cl.
*G06F 16/21* (2019.01)
*G06F 21/62* (2013.01)
*G06Q 30/0601* (2023.01)

(52) U.S. Cl.
CPC .......... *G06F 16/21* (2019.01); *G06F 21/6245* (2013.01); *G06Q 30/0623* (2013.01)

(58) Field of Classification Search
CPC ............... G06F 16/21; G06F 21/6245; G06Q 30/0623; G06Q 30/0253; G06Q 30/0255; G06Q 30/0268; G06Q 30/0269
See application file for complete search history.

(56) References Cited

U.S. PATENT DOCUMENTS

| 10,577,237 | B2  | 3/2020  | Fieglein |  |
|------------|-----|---------|----------|--|
| 2014/0363059 | A1 | 12/2014 | Hurewitz |  |
| 2017/0308964 | A1* | 10/2017 | Morris | G06V 40/28 |
| 2020/0140256 | A1* | 5/2020 | Setchell | G07F 13/025 |

FOREIGN PATENT DOCUMENTS

EP    2704088 A1    3/2014

OTHER PUBLICATIONS

International Search Report and Written Opinion received for Application No. PCT/US21/72089, dated Feb. 23, 2022, 14 Pages.

* cited by examiner

*Primary Examiner* — Etienne P Leroux
*Assistant Examiner* — Cindy Nguyen
(74) *Attorney, Agent, or Firm* — Mintz, Levin, Cohn, Ferris, Glovsky and Popeo, P.C.

(57) ABSTRACT

Data characterizing wireless emissions of a mobile device of a fuel dispenser user can be received. An identity-less parameter associated with the mobile device of the fuel dispenser user can be determined from the received data. A determination of whether the identity-less parameter is associated with a database record characterizing a profile and stored in a profile database can be made. The determination of whether the identity-less parameter is associated with the database record can be provided.

17 Claims, 4 Drawing Sheets

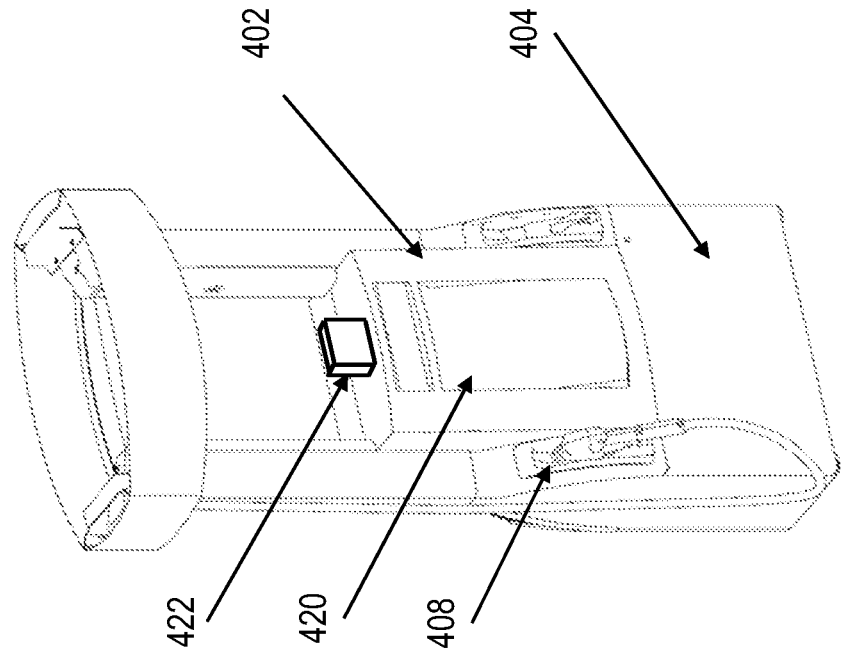
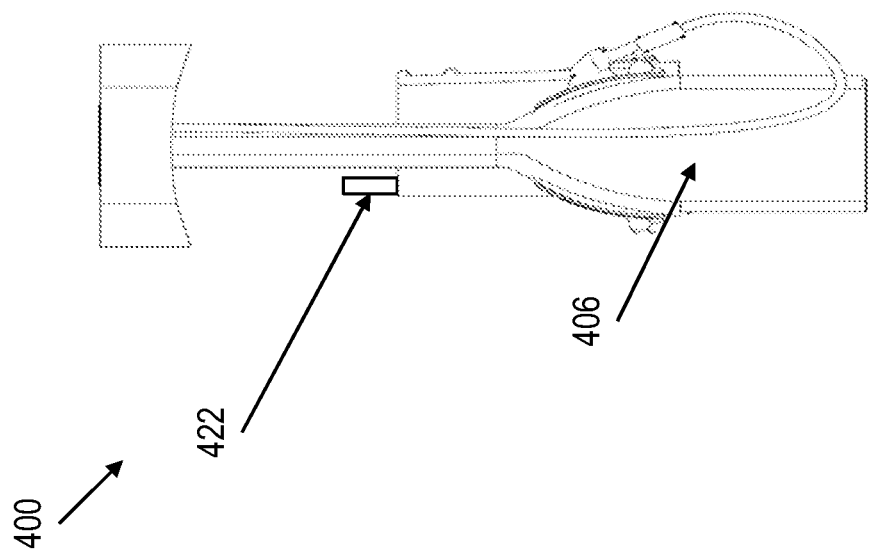

IDENTITY-LESS PERSONALIZED COMMUNICATION SERVICE

CROSS-REFERENCE TO RELATED APPLICATIONS

This application claims priority to U.S. Provisional Patent Application No. 63/107,105, filed Oct. 29, 2020, and entitled "IDENTITY-LESS PERSONALIZED MEDIA SERVICE," the contents of which are hereby incorporated herein by reference in their entirety.

FIELD

The current subject matter relates to an identity-less personalized communication service.

BACKGROUND

During the course of sales transactions at fueling stations, merchants (e.g., fuel providers, convenience store suppliers, etc.) may collect and maintain data pertaining to the sales transactions that includes personally identifiable information (PII) in a database. And, the merchants may operate loyalty programs for incentivizing customers to make purchases at the fueling stations. Some loyalty programs utilize the PII to identify a customer and to associate a loyalty program account with the customer. To acquire the PII, some loyalty programs can require the customer to sign up for and opt into the loyalty program.

However, in certain circumstances, it may not be possible to maintain the personally identifiable information (PII) in the database, although it may be beneficial to maintain the underlying data characterizing the sales transactions in the database without the presence of the personally identifiable information (PII).

SUMMARY OF THE INVENTION

Methods and systems for an identity-less personalized communication service are provided. Related apparatus, systems, techniques, and articles are also described.

In one aspect, data characterizing wireless emissions of a mobile device of a fuel dispenser user can be received. An identity-less parameter associated with the mobile device of the fuel dispenser user can be determined from the received data. A determination of whether the identity-less parameter is associated with a database record characterizing a profile of the fuel dispenser user and stored in a profile database can be made. The determination of whether the identity-less parameter is associated with the database record can be provided.

One or more of the following features can be included in any feasible combination. For example, the identity-less parameter can include a wireless emissions signature characterizing a unique identifier of the mobile device. For example, the received data can include a personally-identifiable parameter associated with the identity-less parameter, and the determination of the identity-less parameter can include disassociating the identity-less parameter from the personally-identifiable parameter. For example, the personally identifiable parameter can characterize personally identifiable information of the fuel dispenser user, and the identity-less parameter cannot characterize the personally identifiable information of the fuel dispenser user. For example, in response to a determination that the identity-less parameter is not associated with the database record, a new database record associating the identity-less parameter with a new profile associated with the mobile device of the fuel dispenser user can be created. For example, in response to a determination that the identity-less parameter is associated with the database record, the database record can be retrieved for editing. For example, a purchase of goods or services at a purchase terminal by the fuel dispenser can be associated with the identity-less parameter based on the received data, and data characterizing the purchase can be added to demographic information included in the database and based on the association. For example, a length of time during which a convenience store sensor, associated with one or more items for sale, received the data used to determine the identity-less parameter can be monitored. For example, the monitored length of time can be associated with the identity-less parameter to thereby generate a browsing history associated with the one or more items for sale, and data characterizing the browsing history can be added to the database record based on the association. For example, a targeted communication can be determined based on the identity-less parameter and the profile characterized by the database record, and the targeted communication can be provided to a display of a fuel dispenser for viewing by the fuel dispenser user. For example, the providing of the determination of whether the identity-less parameter is associated with the database record can include storing, displaying, transmitting, and/or processing. For example, the targeted communication can be provided to a digital sign located at the fueling station for presentation on a display thereof to the fuel dispenser user. For example, the targeted communication can be presented on the display of the digital sign when a convenience store sensor receives the data used to determine the identity-less parameter. For example, the targeted communication can be provided to the mobile device for presentation on a display thereof to the fuel dispenser user. For example, the targeted communication can be determined based on a loyalty rewards account that can be included in the database record. For example, the targeted communication can be determined based on a browsing history associated with one or more items for sale at the fueling station, and the browsing history can be included in the database record. For example, the targeted communication can be determined based on a history of purchases of one or more items for sale at the fueling station, the purchase history can be included in the database record.

In another aspect, a system is provided and can include at least one data processor and memory storing instructions configured to cause the at least one data processor to perform operations described herein. The operations can include receiving data characterizing wireless emissions of a mobile device of a fuel dispenser user, determining an identity-less parameter from the received data, the identity-less parameter associated with the mobile device of the fuel dispenser user, determining whether the identity-less parameter is associated with a database record, the database record characterizing a profile and stored in a profile database, and providing the determination of whether the identity-less parameter is associated with the database record.

One or more of the following features can be included in any feasible combination. For example, the identity-less parameter can include a wireless emissions signature characterizing a unique identifier of the mobile device. For example, the received data can include a personally-identifiable parameter associated with the identity-less parameter, and the determination of the identity-less parameter can include disassociating the identity-less parameter from the personally-identifiable parameter. For example, the personally identifiable parameter can characterize personally identifiable information of the fuel dispenser user, and the identity-less parameter cannot characterize the personally identifiable information of the fuel dispenser user.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 3A is a side perspective view of one embodiment of a fuel dispenser;

FIG. 3B is a front perspective view of the fuel dispenser shown in FIG. 3A.

DETAILED DESCRIPTION

Figure 1:
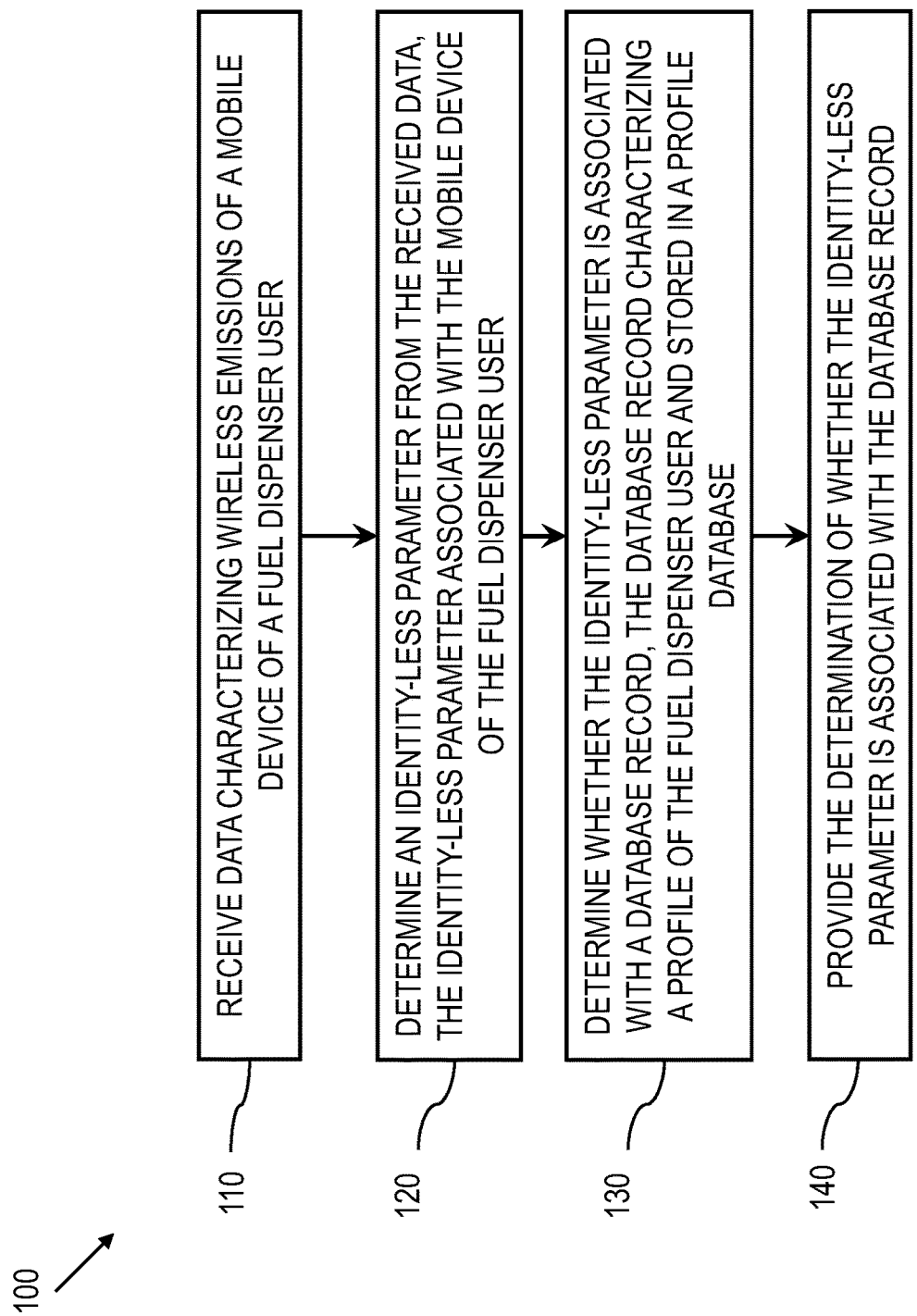
FIG. 1 is a process flow diagram illustrating an example process 100 of some implementations of the current subject matter that can provide for an identity-less personalized communication service.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, systems and methods for providing an identity-less personalized media service are provided. At fueling stations, merchants (e.g., fuel providers, convenience store suppliers, etc.) may try to market products of interest to fuel dispenser users through various forms of media, such as signage, flyers, posters, and video displays. However, the marketing provided by merchants may not always be targeted at the interests of the fuel dispenser users. To resolve this, a merchant may provide targeted communications, such as personalized advertisements or notifications of incentives to purchase a product, to the fuel dispenser user based on data characterizing the fuel dispenser user (e.g., personally identifiable information of the fuel dispenser user that has been previously collected by the merchant, the fuel dispenser user's loyalty account points and/or account status that is associated with the personally identifiable information, etc.). However, it may not be possible to collect and maintain a database of personally identifiable information (PII) associated with fuel dispenser users for use in determining targeted communication content for technical or legal reasons. Furthermore, in some circumstances it may not be technically possible to collect data characterizing a fuel dispenser user and to determine the targeted communication content without the data containing personally identifiable information. The systems and methods described herein can remedy this issue by, for example, gathering information about a fuel dispenser user by obtaining, from one or more receivers/sensors, the wireless data emitted from the one or more of the fuel dispenser user's mobile devices (e.g., mobile phone, smart watch, etc.), determining an identity-less parameter that does not contain any personally identifiable information (PII) from the received wireless data, and using the obtained identity-less parameter to search for and retrieve a database record associated with a profile of a fuel dispenser user that corresponds to the identity-less parameter associated with the fuel dispenser user's mobile devices. Determining the identity-less parameter can include disassociating the information identifying identity from information that does not.

In some implementations, the retrieved database record can be accessed and edited to add additional properties about the fuel dispenser user to the database record, including demographic information about the fuel dispenser user (e.g., gender, height, weight, demeanor, etc.), the fuel dispenser user's purchase history for purchases made at the fuel dispenser and/or other parts of the fueling station (e.g., car wash, fueling station convenience store, etc.), the fuel dispenser user's history of browsing for convenience store items while in a fueling station convenience store, the fuel dispenser user's payment information, and the like, that are determined by images of the fuel dispenser user and by the receipt of the electronic emissions of the fuel dispenser user's mobile devices at various locations within the fueling environment. In some implementations, the retrieved database record can be accessed and edited to add a loyalty status indicator indicating that the fuel dispenser user is a "loyal" customer. Notably, the additional properties do not include any personally identifiable information (PII), as the additional properties are determined based on the received electronic emissions of the fuel dispenser user's mobile devices, the received images of the fuel dispenser user, and/or status indicator inputs provided by fueling station attendants/operators. The additional properties are not based on any fuel dispenser user personally identifiable information (PII) supplied by the fuel dispenser user or by any other party. The edited database record can then be provided to a communication generation system, which can analyze the database record and generate a targeted communication that is likely to be of interest to the fuel dispenser user based on the database record. The targeted communication can be provided to a display of the fuel dispenser, the fuel dispenser user's mobile devices, and/or a digital sign at the fueling station convenience store, for viewing by the fuel dispenser user at the appropriate time. By not collecting personally identifiable information (PII), some implementations of the current subject matter can provide for the determination of targeted communication content in environments where it is not possible or feasible to collect and maintain a database of personally identifiable information for use in determining and providing targeted communications to fuel dispenser users.

Figure 2:
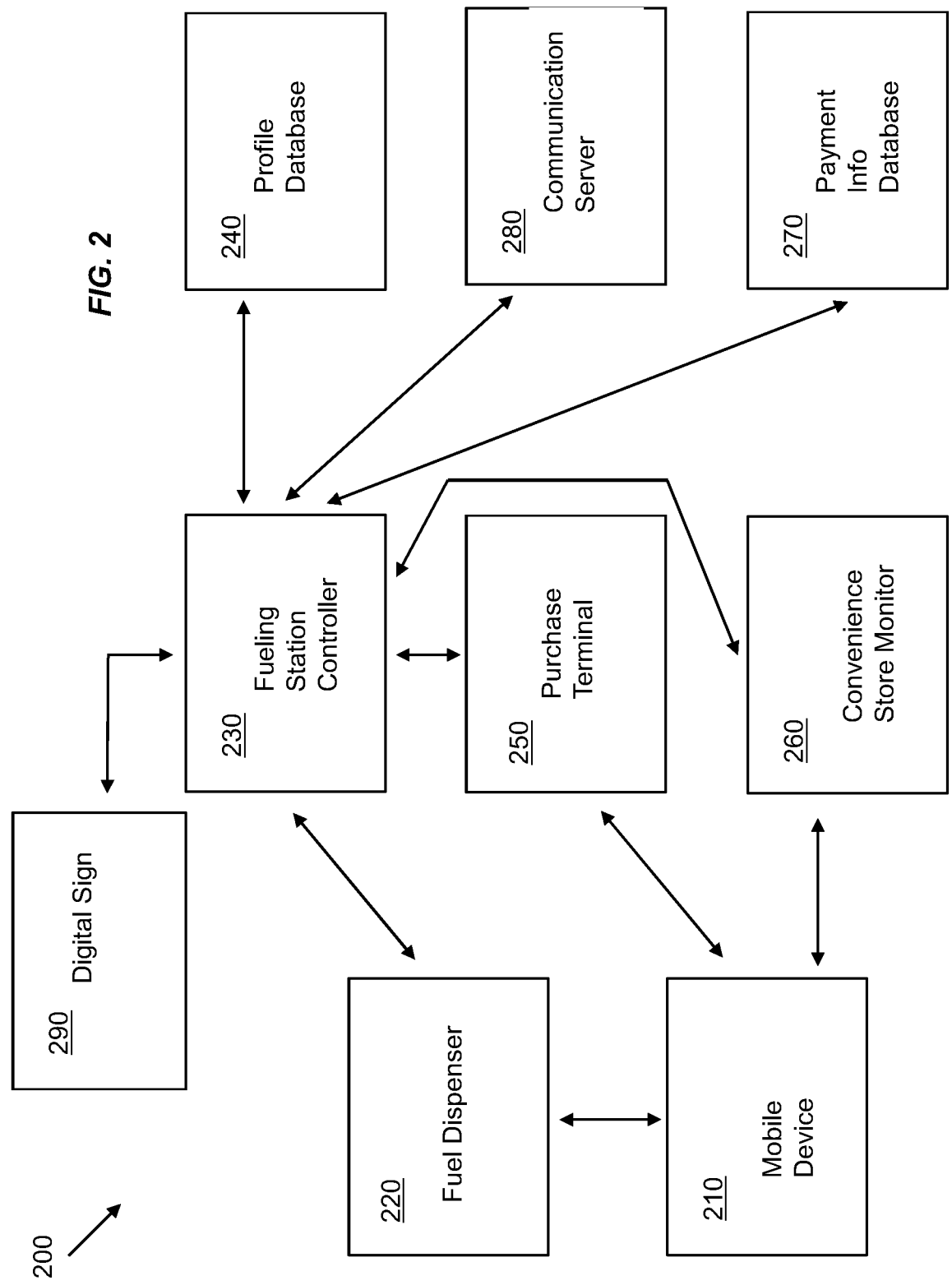
FIG. 2 is a system diagram illustrating an example system 200 that incorporates some implementations of the current subject matter and that can provide for an identity-less personalized communication service.

FIG. 1 is a process flow diagram illustrating an example process 100 of some implementations of the current subject matter that can provide for an identity-less personalized communication service, and FIG. 2 is a system diagram illustrating an example system 200 that incorporates some implementations of the current subject matter and that can provide for the same. As shown in FIG. 2, in some implementations, the system 200 can include a mobile device 210, such as a mobile phone, a smart watch, a personal fitness tracker, radio frequency identifier (RFID) tag, near-field communication (NFC) tag, or any other mobile device capable of emitting electromagnetic signals, that is configured to repeatedly transmit wireless signals indicative of an identity of the mobile device 210. In some implementations, the mobile device 210 can be a plurality of mobile devices 210 having the functionality described above.

In some implementations, the system 200 can further include a fuel dispenser 220 configured to dispense fuel and having at least one data processor configured to perform the functionality described herein, at least one sensor configured to receive the wireless signals transmitted by the mobile device 210, and an image sensor configured to obtain an image of an area surrounding the fuel dispenser and of the fuel dispenser user, and further configured to determine an identity-less parameter from the wireless signals that indicates the identity of the mobile device 210, to receive payment information from the fuel dispenser user, and to transmit the identity-less parameter, the payment information, and/or image data characterizing the image obtained by the image sensor.

In some implementations, the system 200 can further include a fueling station controller 230 in operable communication with the fuel dispenser 220 that is configured to manage the dispensation of fuel from the fuel dispenser 220, to receive the payment information from the fuel dispenser 220, and to perform processing on database records associated with wireless signals received from the mobile device 210 via the fuel dispenser 220 and other sensors described in detail herein.

In some implementations, the system 200 can further include a profile database 240 in operable communication with the fueling station controller 230 that is configured to store database records characterizing profiles of fuel dispenser users and to transmit a database record associated with the identity-less parameter to the fueling station controller 230 when requested to do so by the fueling station controller 230.

In some implementations, the system 200 can further include a purchase terminal 250, in operable communication with the fueling station controller 230 and the mobile device 210, that is configured to process purchases of goods and services available for sale at a fueling station, to receive the wireless signals from the mobile device 210 and to determine the identity-less parameter from the wireless signals, to associate the identity-less parameter with a purchase of goods and services available for sale, and to transmit data indicative of the association between the identity-less parameter and the purchase to the fueling station controller for addition to the database record retrieved by the fueling station controller 230 from the profile database 240. In some implementations, the purchase terminal 250 can associate the identity-less parameter with a loyalty status of the fuel dispenser user. For example, in some implementations, the purchase terminal 250 receive an input from a fueling station operator indicating that the fuel dispenser user is a "loyal" customer and is to be assigned a "loyal customer" loyalty status. In some implementations, in response to receipt of the input and determination of the identity-less parameter from the wireless signals, the purchase terminal 250 can generate and transmit data indicative of the association between the identity-less parameter and the loyalty status for addition to a loyalty rewards account included in the database record retrieved by the fueling station controller 230.

In some implementations, the system 200 can further include a convenience store monitor 260, located near goods available for sale in a fueling station convenience store, in operable communication with the mobile device 210 and the fueling station controller 230, having at least one sensor configured to receive the wireless signals from the mobile device 210, and configured to monitor a length of time during which the wireless signals are received from the mobile device 210, to determine the identity-less parameter from the received wireless signals, to associate the identity-less parameter and the monitored length of time with the position of the convenience store sensor to thereby form a browsing history for the goods available for sale, and to transmit the browsing history to the fueling station controller 230 for adding to the database record. In some implementations, the purchase terminal 250 can associate the identity-less parameter with the above-described loyalty status of the fuel dispenser user. For example, in some implementations, the purchase terminal 250 receive an input from a fueling station operator indicating that the fuel dispenser user is a "loyal" customer and is to be assigned a "loyal customer" loyalty status. In some implementations, in response to receipt of the input and determination, by the convenience store monitor 260, of the identity-less parameter from the wireless signals of the fuel dispenser user's mobile device 210, the purchase terminal 250 can generate and transmit data indicative of the association between the identity-less parameter determined by the convenience store monitor 260 and the assigned loyalty status for addition to a loyalty rewards account included in the database record retrieved by the fueling station controller 230.

In some implementations, the system 200 can further include a payment information database 270 in operable communication with the fueling station controller that is configured to transmit disassociated payment information that is not associated with the database record for association, by the fueling station controller 230, with the database record and addition to the database record.

In some implementations, the system 200 can further include an communication server 280 that is configured to receive the database record from the fueling station controller 230, to determine a targeted communication, which may include an advertisement, based on the information contained in the database record (e.g., browsing history, purchase history, loyalty status/rewards program balances, demographic information, etc.). In some implementations, the communication server 280 can be configured to transmit the targeted communication to the fueling station controller 230 for transmission to the fuel dispenser 220 and presentation on a display of the fuel dispenser 220. In some implementations, the communication server 280 can be configured to transmit the targeted communication to the fueling station controller 230 for transmission to the mobile device 210 and presentation on a display thereof. In some implementations, the communication server 280 can be configured to transmit the targeted communication to the fueling station controller 230 for transmission to digital signage at the fueling station (such as digital sign 290, described below) for presentation on a display thereof.

In some implementations, the system 200 can further include a digital sign 290 that, as explained above, is configured to receive the determined targeted communication and to present the targeted communication on a display thereof. In some implementations, the digital sign 290 can be configured such that the targeted communication is presented on the display of digital sign 290 when the fuel dispenser user is in proximity to the digital sign 290. For example, in some implementations, the digital sign 290 can include a sensor configured to receive the wireless signals from the mobile device 210, to determine the identity-less parameter from the received wireless signals, and to display the targeted communication on the display of the digital sign 290 in response to the determined identity-less parameter. In some implementations, the digital sign 290 can be configured such that the targeted communication is displayed on the display of the digital sign 290 when the convenience store monitor 260 determines the identity-less parameter from the wireless signals of the mobile device 210 received by the sensor of the convenience store monitor 260 described above. In some implementations, the digital sign 290 can be a plurality of digital signs.

Referring to both FIGS. 1 and 2, at 110, data characterizing wireless emissions of a mobile device, such as mobile device 210, of a fuel dispenser user can be received. In some implementations, the data can be received by a sensor located at a fuel dispenser, such as fuel dispenser 220, which is in wireless communication with the mobile device 210. In some implementations, the data can be received by at least one convenience store sensor located in a fueling station convenience store, such as that incorporated into convenience store monitor 260 that is in wireless communication with the mobile device 210. In some implementations, the data can be received by at least one sensor operably coupled to a purchase terminal, such as purchase terminal 250, that is located at a point-of-sale terminal in the fueling station convenience store. As explained above, in some implementations, the data can be received by at least one sensor operably coupled to a digital sign, such as digital sign 290.

Referring still to FIGS. 1 and 2, at 120, an identity-less parameter, associated with the mobile device 210 of the fuel dispenser user, can be determined from the received data. In some implementations, the identity-less parameter can comprise a wireless emissions signature that characterizes a unique identifier of the mobile device 210. As such, the wireless emissions signature is uniquely associated with the fuel dispenser user's mobile device 210. Accordingly, as the mobile device 210 is typically in close proximity to the fuel dispenser user, the wireless emissions signature can be used to indicate that the fuel dispenser user is in the vicinity of any of the aforementioned sensors that are located within the fueling station environment.

In some implementations, the identity-less parameter can be contained within the received data, and, in some implementations, the identity-less parameter can be derived from the received data after the received data is analyzed by a processor operably coupled to the sensor that received the data. For example, in some implementations, in determining the identity-less parameter, the received data can be tokenized such that the identity-less parameter is a token that characterizes the received data in a secure manner. In addition, in some implementations, the identity-less parameter can be associated with a personally-identifiable parameter that is also contained within the received data. In some implementations, the personally-identifiable parameter contains, indicates, or is otherwise associated with personally identifiable information (PII) of the fuel dispenser user, and the identity-less parameter is not associated with the personally identifiable information (PII) of the fuel dispenser user.

At 130, a determination of whether the identity-less parameter is associated with a database record is made. The database record can characterize a profile of the fuel dispenser user and be stored in a profile database, such as profile database 240, which may be located at the fueling station or at a remote location. In some implementations, the database record can comprise a compilation of wireless emissions from mobile device 210, such as the identity-less parameter, that have been previously received at sensors located at various dispensers, convenience stores, digital signs, and purchase terminals located at various fueling stations, as well as associations between the received wireless emissions and data characterizing various recorded customer behaviors, such as a browsing history characterizing a customer browsing for items at a fueling station convenience store, a customer making fueling purchases at a fuel dispenser, a purchase history characterizing a customer making convenience store item purchases at a convenience store purchase terminal, an external merchant purchase history characterizing purchases made at external retail facilities unrelated to the fueling station, and the like. In some implementations, the database record can comprise a compilation of wireless emissions from multiple mobile devices associated with the fuel dispenser user and associations of the wireless emissions from each device with the fuel dispenser user, such that the database record can, in effect, characterize an aggregated "digital fingerprint" of the fuel dispenser user and thereby characterize a profile of the fuel dispenser user without including any of the fuel dispenser user's personally identifiable information (PII).

In some implementations, the database record can include a loyalty rewards account that characterizes a loyalty program status of the database record (e.g., the record is associated with a "loyal" fuel dispenser user) and/or balances of various loyalty incentives (e.g., accrued loyalty points, accrued loyalty awards, available discounts) that are available in accordance with one or more loyalty program schemes. As such, a loyalty rewards account can be associated with the fuel dispenser user characterized by the database record via its inclusion in the database record, and the information characterized by the loyalty rewards account can be used in the determination of targeted communications as described below. In some implementations, the loyalty program schemes can be established by merchant operators of the fueling station. In some implementations, the loyalty program schemes can established by external merchants, external retailers, and/or external loyalty program providers.

To make the determination of whether the identity-less parameter is associated with a database record, a query of the profile database is made by the fueling station controller, such as fueling station controller 230, to ascertain whether the profile database, such as profile database 240, contains database records stored thereon that contain, indicate, or are otherwise associated with the received identity-less parameter. If at least one database record stored in the profile database contains, indicates, or is otherwise associated with the received identity-less parameter, a determination that the identity-less parameter is associated with a database record is made. If there is no such database record, a determination that the identity-less parameter is not associated with a database record is made. As explained in further detail below, this determination is used to initiate a variety of different actions.

At 140, the determination of whether the identity-less parameter is associated with a database record is provided. In some implementations, the providing can include storing, displaying, transmitting, and/or processing of the determination.

In some implementations, in response to determining that the identity-less parameter is not associated with a database record in the profile database, a new database record that associates the identity-less parameter with a new profile of a fuel dispenser user that is not not associated with any existing record stored in the profile database is created. In some implementations, the new database record can be created by the fueling station controller 230, and, in some implementations, the profile database 240 or other components in operable communication with the profile database 240 and the fueling station controller 230 can create the new database record. In creating the new database record, the identity-less parameter is associated with the new database record, which thereby associates the mobile device 210 of the fuel dispenser user with the new database record. This can allow for data characterizing the various customer behaviors described herein to be associated with the identity-less parameter, assembled and associated with or added to the new database record, and stored in the profile database 240 as described herein for later use in accordance with the systems and methods described herein.

In some implementations, in response to determining that the identity-less parameter is associated with a database record, the database record can be retrieved for editing by the fueling station controller 230. The various customer behaviors described above can be added to the database record or otherwise associated with the database record when the identity-less parameter, embedded in the data received from the mobile device 210, is received by one of the sensors and/or components described herein and coincides with the occurrence of the customer behaviors described herein.

In addition, in some implementations, image data characterizing the fuel dispenser user can be obtained, analyzed, and provided for further processing and analysis. The image data can be received from an image sensor configured to obtain an image of an area surrounding the fuel dispenser and of the fuel dispenser user when located at the fuel dispenser. In some implementations, the image data can be received from a convenience store image sensor positioned in the fueling station convenience store and configured to obtain an image of the fuel dispenser user when located in the fueling station convenience store.

In some implementations, demographic information of the fuel dispenser user can be determined based on the image data received from the fuel dispenser's image sensor and/or the convenience store image sensor. The demographic information determined can include, by way of non-limiting example, a height, a weight, a gender, and a demeanor of the fuel dispenser user. In some implementations, the demographic information can include a unique physical appearance of the fuel dispenser user, which can be determined using conventional image recognition techniques (e.g., computer vision, etc.). In some implementations, the demographic information determined from the image data can be used by the fueling station controller 230, or one of the other components described herein, to correlate the identity-less parameter, determined from the received wireless emissions of the mobile device 210 by one or more of the aforementioned sensors, with the database record.

In some implementations, a determination of whether the demographic information is included in the aforementioned retrieved database record can be made. In response to a determination that the demographic information is not included in the database record, the demographic information can be added to the retrieved database record such that the demographic information is associated with the profile of the fuel dispenser user characterized by the database record.

In some implementations, a determination of whether the retrieved database record includes previously recorded demographic information is made. In response to a determination that the retrieved database record includes the previously recorded demographic information, a further determination of whether the demographic information, ascertained via the fuel dispenser image sensor data and/or the convenience store image sensor data, matches the previously recorded demographic information is made. In response to a determination that the demographic information, ascertained via the fuel dispenser image sensor data and/or the convenience store image sensor data, does not match the previously recorded demographic information, an event indicating that the demographic information does not match the previously recorded demographic information is generated.

In some implementations, payment information used in transactions at a fueling station can be received at the fuel dispenser 220 from a payment device of the fuel dispenser user, which can be a credit/debit card or other form of electronic payment, and transmitted to the fueling station controller 230 for further processing and analysis. A determination of whether the received payment information is included in the retrieved database record can be made. In response to determining that the payment information is not included in the retrieved database record, the received payment information can be added to the retrieved database record such that the payment information is associated with the profile of the fuel dispenser user characterized by the database record.

In some implementations, a payment information database (such as payment information database 270) including payment information that is disassociated with any customer records can be queried to determine whether the received payment information matches any portions of the disassociated payment information. In response to determining that the received payment information matches the disassociated payment information, the disassociated payment information can be added to the database record such that the disassociated payment information is associated with the profile of the fuel dispenser user characterized by the database record.

As mentioned above, the data emitted by the mobile device 210 can be received at the fuel dispenser 220. In some implementations, this data can be wirelessly received by a sensor in operable communication with the fuel dispenser. The received data can be used to determine the proximity of the mobile device to the fuel dispenser, and, accordingly, can indicate that the fuel dispenser user is near the fuel dispenser. When a purchase of fuel is made by the fuel dispenser user and at the fuel dispenser 220 during the time at which the sensor associated with the fuel dispenser 220 receives the data emitted by the mobile device 210, the purchase of fuel can be associated with the identity-less parameter of the mobile device 210, and data characterizing the association between the purchase of fuel and the identity-less parameter can be provided to the fueling station controller 230. The fueling station controller 230 can add data characterizing the purchase of fuel to demographic information (such as that described above) and other forms of information described herein that are associated with the profile of the fuel dispenser user and included in the database record.

In some implementations, the data emitted by the mobile device 210 can be received at a purchase terminal 250 located at the fueling station. In some implementations, the purchase terminal 250 is located inside a convenience store located at the fueling station. In some implementations, the purchase terminal 250 is located in the forecourt of the fueling station. Similar to the functionality described above, the data can be wirelessly received by a sensor in operable communication with the purchase terminal 250, and the data can be used to determine the proximity of the mobile device 210 to the purchase terminal 250, and, accordingly, can indicate that the fuel dispenser user is near the purchase terminal 250. When a purchase of goods and services is made by the fuel dispenser user and at the purchase terminal 250 during the time at which the sensor associated with the purchase terminal receives the data emitted by the mobile device 210, the purchase of goods/services can be associated with the identity-less parameter of the mobile device 210, and data characterizing the association between the purchase of goods and the identity-less parameter can be provided to the fueling station controller 230. The fueling station controller can add data characterizing the purchase of goods/services to demographic information (such as that described above) and other forms of information described herein that are associated with the profile of the fuel dispenser user and included in the database record.

In some implementations, the data emitted by the mobile device 210 can be received at a sensor associated with a convenience store monitor, such as convenience store monitor 260, that is located adjacent to one or more items for sale at the convenience store. Similar to the functionality described above, the data can be wirelessly received by the convenience store monitor sensor, the data can be used to determine the proximity of the mobile device 210 to the sensor, and, accordingly, can indicate that the fuel dispenser user is near the one or more items for sale. The monitor can determine the identity-less parameter from the data received by the sensor, and it can determine a length of time during which the sensor has received the data. The location of the sensor (and, thereby, the location of the one or more items or sale) can be associated with the determined length of time and the determined identity-less parameter to form a browsing history associated with the one or more items for sale. The browsing history can be used to determine how long the fuel dispenser user stayed within the vicinity of the one or more items for sale and presumably browsed the one or more items for sale and considered whether to purchase the one or more items for sale, which can indicate a degree of interest in the one or more items for sale by the fuel dispenser user. The browsing history can be transmitted to the fueling station controller 230 for adding to the database record.

In some implementations, the forms of fuel dispenser user information described above, such as the demographic information that includes the determined physical characteristics described above, the payment information, the fuel and goods/services purchase histories, and the browsing history, are aggregated together in the database record such that the database record is associated with the identity-less parameter (and, thereby, the fuel dispenser user's mobile device) and characterizes a profile of the fuel dispenser user. The database record, which includes the aggregated information and the identity-less parameter, can be provided, to a communication server (such as communication server 280), which can analyze the contents of the database record for further processing as described below. In addition, in some implementations, the updated database record can be transmitted to the profile database 240 for long-term storage thereon and future retrieval.

In some implementations, after the received database record is analyzed by the communication server 280, a targeted communication can be determined based on the received identity-less parameter and the aforementioned aggregated components of the database record that form the profile characterizing the fuel dispenser user via the identity-less parameter received or otherwise determined from the data received from the mobile device 210. The targeted communication can include, for example, an advertisement depicting any of the one or more items for sale in which the fuel dispenser user demonstrated a degree of interest in, as indicated by the received convenience store proximity data described above, but ultimately decided not to purchase. In some implementations, the targeted communication can include, for example, a suggestion to purchase an item, such as fuel or goods/services available for sale at the convenience store, based on the purchase history of the fuel dispenser user (as ascertained by the receipt of the identity-less parameter by the proximity sensors during a purchase of fuel or goods/services available at the convenience store and, when the purchase history characterizes purchases made at external retailers, as received from other remote databases characterizing the external retail purchases). For example, in some implementations, when the purchase history characterized by the database record includes a good/service that is available for sale at the fueling station, the targeted communication can be determined such that it characterizes the suggestion or an incentive (e.g., an available discount, an advertisement, etc.) to purchase the available good/service. In some implementations, the targeted communication can include a suggestion to purchase a complementary good/service that complements one or more goods/services included in the purchase and/or browsing histories. In some implementations, the targeted communication can be determined using a predictive model that can predict that there is a high likelihood that the fuel dispenser user will be interested in the suggested good and/or service. For example, in some implementations, the predictive model can analyze an attribute of the fuel dispenser user characterized by the database record and the goods/services included in the purchase and/or browsing histories and determine whether the attribute and the goods/services included in the purchase and/or browsing histories are substantially correlated with a model attribute present in the predictive model that is associated with a suggested good and/or service. As such, the predictive model can predict that there is a high likelihood that the fuel dispenser user will have an interest in the good and/or service, and, based on the suggested good and/or service outputted by the predictive model, the targeted communication can be determined such that it characterizes the resultant suggested good and/or service.

In some implementations, the targeted communication can be determined based on the loyalty rewards account included in the database record. For example, when the database record indicates that the loyalty rewards account includes a balance of accrued loyalty points that exceeds a predetermined threshold, the targeted communication can include a promotion for a good and/or service that includes an incentive and/or discount that is based on the accrued loyalty points exceeding the threshold. For example, when the database record indicates that the loyalty rewards account includes a "loyal customer" loyalty status, the targeted communication can include a promotion for a good and/or service that includes an incentive and/or discount that is only available to fuel dispenser users having a "loyal customer" loyalty status.

In some implementations, the targeted communication can be provided to a display of the fuel dispenser 220 for viewing and consideration by the fuel dispenser user. In some implementations, the targeted communication can be displayed when the fuel dispenser sensor receives the identity-less parameter emitted from the mobile device 210 (and thereby indicating that the fuel dispenser user is near the fuel dispenser 220 and is more likely to see the targeted communication when it is displayed). In some implementations, the targeted communication can be displayed at the fuel dispenser 220 during a designated time for the display of targeted communications in the course of a fueling transaction.

Similarly, in some implementations, the targeted communication can be provided to the mobile device 210 for viewing on a graphical display thereof and consideration by the fuel dispenser user. In some implementations, the targeted communication can be provided to one or more digital signs, such as digital sign 290 located at the fueling station (e.g., in the convenience store of the fueling station, in the fueling station forecourt, etc.) for presentation and display thereon. In some implementations, the targeted communication can be displayed on digital sign 290 when the sensor of the convenience store monitor 260 and/or the sensor of the digital sign 290 receives the wireless emissions emitted from the mobile device 210 and determines the identity-less parameter from the received wireless emissions (and thereby determining that the fuel dispenser user is near the one or more digital signs and is more likely to see the targeted communication when it is displayed thereon).

Figure 4:
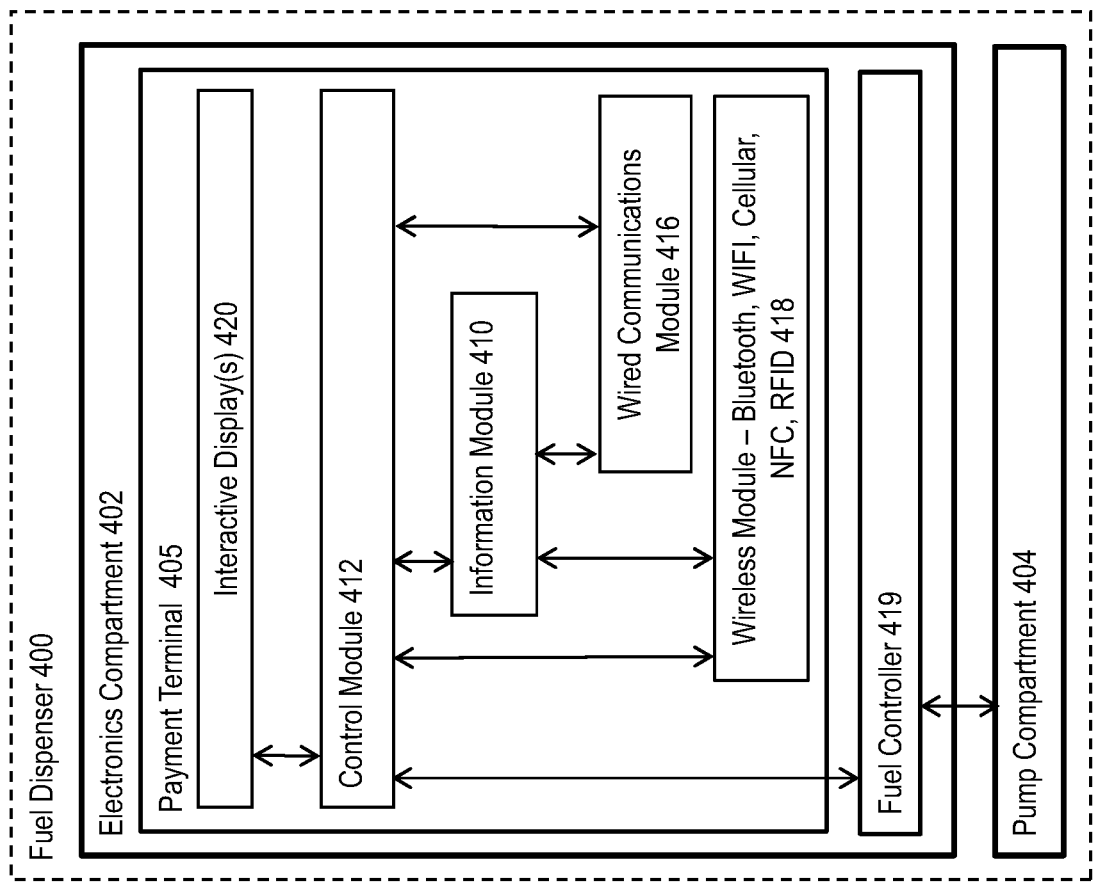
FIG. 4 is a diagram showing internal components of the fuel dispenser of FIGS. 3A and 3B.

FIGS. 3A and 3B illustrate one embodiment of a fuel dispenser 400 that can be used in some implementations of the current subject matter, and FIG. 4 illustrates components of the fuel dispenser. In general, the fuel dispenser 400 includes an electronics compartment 402 and a pump compartment 404. The pump compartment 404 houses a pump configured to pump fuel from a fuel tank or other reservoir, as well as one or more meters that can be configured to monitor fuel flow, flow of fuel additives, and/or flow of other components of the fuel. The pump compartment 404 can also include other components to facilitate fuel dispensing and mixing, such as motors and valves, a strainer/filtering system, a vapor recovery system, and the like. The pump compartment 404 is isolated from the electronics compartment 402 within the fuel dispenser 400 to facilitate safety, security, and/or maintenance, as will be appreciated by a person skilled in the art. Fuel is thus not allowed to flow from the pump compartment 404 to the electronics compartment 302 and instead flows from the pump compartment 404 through hoses 406 to nozzles 408 for dispensing. As will be appreciated by a person skilled in the art, the nozzles 408 are each configured to dispense fuel from the fuel dispenser 400 as pumped therefrom by the pump.

The electronics compartment 402 houses electronics for facilitating payment for fuel and for facilitating the dispensing of the fuel. For example, the electronics compartment 402 can include a fuel controller 419 that, at least in some implementations, includes a data processor, memory, and storage forming part of at least one computing system. The fuel controller 419 is configured to control dispensing of the fuel from the pump compartment 404. The electronics compartment 402 also includes a payment terminal 405 that is configured to receive payment information transmit and receive the payment information and/or the user identification information with a POS system via a forecourt controller (such as fueling station controller 220) and deliver fueling instructions to the fuel controller 419 to dispense fuel.

The payment terminal 405 can be configured to facilitate communication between a user and the fuel controller 419, and can include an interactive display 420 and an information module 410. The information module 410 can, at least in some implementations include a data processor, memory, and storage, forming part of at least one computing system. The payment terminal 405 can also include one or more wired communication modules 416 and/or wireless communication modules 418 and a control module 412 that, at least in some implementations includes a data processor, memory, and storage, forming part of at least one computing system. The communication modules 416, 418 can function to allow data to be transmitted to and from various components within the payment terminal 405 via wired and/or wireless communication, respectively. For example, the communication modules 416, 418 can be configured to transmit and receive signals that can characterize, e.g., payment information, user identification information, and/or information regarding a desired fuel selection, via wired and/or wireless communications, respectively. The wireless communication module 418 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 416, 418 can be according to any of a variety of communication protocols, e.g., TCP/IP, etc., as will be appreciated by a person skilled in the art.

The interactive display 420, which can be, or can include, a touchscreen that is configured to display the aforementioned targeted communication. The interactive display 420 can be operably coupled to the control module 412 which can be used to control, dynamically rearrange, and/or update a graphical user interface (GUI) rendered on the display 420. The display 420 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 412 to be processed. Some examples of information that the display 420 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select.

To facilitate payment, the information module 410 can be configured to receive input such as, e.g., payment information, and deliver the information to the control module 412. For example, the information module 410 can include a barcode and/or QR code scanner, and/or a NFC contactless card reader for receiving the payment information.

In some embodiments, the information module 410 can be in operable communication with an image sensor 422 that is disposed on an exterior surface of the fuel dispenser for acquiring images of facial and body features of the user. In some implementations, the image sensor may be disposed in one of the fuel dispenser housing components (e.g., electronics compartment 402 or pump compartment 404).

As shown in FIG. 4, the information module 410 can be operably coupled to the wireless emissions receiver 416 and/or the wireless communication module 418. Although the wireless communication module 418 is shown to be located within the payment terminal, the wireless communication module 418 can be located elsewhere on, within, or in the vicinity of, the fuel dispenser 400. For example, the wireless communication module 418 can be mounted on top of the fuel dispenser, which can facilitate retrofitting the wireless communication module 418 to existing fuel dispensers and/or facilitate repair, upgrade, or other maintenance of the communication module 418, as described in U.S. patent application Ser. No. 15/182,201 filed on Jun. 14, 2016 and entitled "Methods and Devices for Fuel Dispenser Electronic Communication."

The subject matter described herein can provide several advantages. By using the functionality and components described above, a merchant can generate a targeted communication tailored to the interests of a fuel dispenser user without having to collect or access any personally identifiable information (PII) associated with the fuel dispenser user to determine the content for the targeted communication. And, some implementations of the current subject matter can provide an improved user interface of a fuel dispenser at least because the fuel dispenser user is not required to input any information to receive a communication that is tailored to their interests.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
receiving data including a personally-identifiable parameter and characterizing wireless emissions of a mobile device of a fuel dispenser user;
determining an identity-less parameter including a wireless emission signature characterizing a unique identifier of the mobile device from the received data, the identity-less parameter associated with the mobile device of the fuel dispenser user and the personally-identifiable parameter, wherein the determining the identity-less parameter includes disassociating the identity-less parameter from the personally-identifiable parameter;
determining whether the identity-less parameter is associated with a database record, the database record characterizing a profile of the fuel dispenser user and stored in a profile database; and
providing the determination of whether the identity-less parameter is associated with the database record.

2. The method of claim 1, wherein the personally-identifiable parameter characterizes personally identifiable information of the fuel dispenser user, and the identity-less parameter does not characterize the personally identifiable information of the fuel dispenser user.

3. The method of claim 1, further comprising:
in response to determining that the identity-less parameter is not associated with the database record, creating a new database record associating the identity-less parameter with a new profile, the new profile associated with the fuel dispenser user.

4. The method of claim 1, further comprising:
in response to determining that the identity-less parameter is associated with the database record, retrieving the database record for editing.

5. The method of claim 4, further comprising:
associating a purchase of goods or services at a purchase terminal, by the fuel dispenser user, with the identity-less parameter based on the received data; and
adding data characterizing the purchase to demographic information included in the database record based on the association.

6. The method of claim 4, further comprising:
monitoring a length of time during which a convenience store sensor received the data used to determine the identity-less parameter, the convenience store sensor associated with one or more items for sale at the fueling station;
associating the monitored length of time with the identity-less parameter to thereby generate a browsing history associated with the one or more items for sale; and
adding data characterizing the browsing history to the database record based on the association.

7. The method of claim 1, further comprising:
determining a targeted communication based on the identity-less parameter and the profile characterized by the database record; and
providing the targeted communication to a display of a fuel dispenser for viewing by the fuel dispenser user.

8. The method of claim 1, wherein the providing includes storing, displaying, transmitting, and/or processing.

9. The method of claim 7, further comprising:
providing the targeted communication to a digital sign located at the fueling station for presentation on a display thereof to the fuel dispenser user.

10. The method of claim 9, wherein the targeted communication is presented on the display of the digital sign when a convenience store sensor receives the data used to determine the identity-less parameter.

11. The method of claim 7, further comprising:
providing the targeted communication to the mobile device for presentation on a display thereof to the fuel dispenser user.

12. The method of claim 7, wherein the targeted communication is determined based on a loyalty rewards account included in the database record.

13. The method of claim 7, wherein the targeted communication is determined based on a browsing history associated with one or more items for sale at the fueling station, the browsing history included in the database record.

14. The method of claim 7, wherein the targeted communication is determined based on a history of purchases of one or more items for sale at the fueling station, the purchase history included in the database record.

15. A system comprising:
at least one data processor; and
memory storing instructions configured to cause the at least one data processor to perform operations comprising:
receiving data including a personally-identifiable parameter and characterizing wireless emissions of a mobile device of a fuel dispenser user;
determining an identity-less parameter including a wireless emission signature characterizing a unique identifier of the mobile device from the received data, the identity-less parameter associated with the mobile device of the fuel dispenser user and the personally-identifiable parameter, wherein the determining the identity-less parameter includes disassociating the identity-less parameter from the personally-identifiable parameter;
determining whether the identity-less parameter is associated with a database record, the database record characterizing a profile of the fuel dispenser user and stored in a profile database; and
providing the determination of whether the identity-less parameter is associated with the database record.

16. The system of claim 15, wherein the personally-identifiable parameter characterizes personally identifiable information of the fuel dispenser user, and the identity-less parameter does not characterize the personally identifiable information of the fuel dispenser user.

17. A non-transitory computer program product storing instructions which, when executed by at least one data processor forming part of at least one computing system, cause the at least one data processor to implement operations comprising:
receiving data including a personally-identifiable parameter and characterizing wireless emissions of a mobile device of a fuel dispenser user;
determining an identity-less parameter including a wireless emission signature characterizing a unique identifier of the mobile device from the received data, the identity-less parameter associated with the mobile device of the fuel dispenser user and the personally-identifiable parameter, wherein the determining the identity-less parameter includes disassociating the identity-less parameter from the personally-identifiable parameter;

determining whether the identity-less parameter is associated with a database record, the database record characterizing a profile of the fuel dispenser user and stored in a profile database; and providing the determination of whether the identity-less parameter is associated with the database record.

\* \* \* \* \*